US008693179B2

(12) United States Patent
Wei

(10) Patent No.: US 8,693,179 B2
(45) Date of Patent: Apr. 8, 2014

(54) PORTABLE ELECTRONIC DEVICE AND DETACHABLE TOUCH STRUCTURE THEREOF

(75) Inventor: Ren-Jing Wei, New Taipei (TW)

(73) Assignee: Wistron Corporation, New Taipei (TW)

( * ) Notice: Subject to any disclaimer, the term of this patent is extended or adjusted under 35 U.S.C. 154(b) by 203 days.

(21) Appl. No.: 13/463,164

(22) Filed: May 3, 2012

(65) Prior Publication Data

US 2013/0027864 A1 Jan. 31, 2013

(30) Foreign Application Priority Data

Jul. 27, 2011 (TW) .............................. 100213832 U

(51) Int. Cl.
*H05K 5/00* (2006.01)

(52) U.S. Cl.
USPC .............. 361/679.18; 361/679.19; 361/679.3; 345/157; 345/159; 345/163; 345/164; 345/167

(58) Field of Classification Search
USPC ................. 361/679.18, 679.19, 679.3, 679.1; 345/168, 169, 157, 159, 163, 164, 167
See application file for complete search history.

(56) References Cited

U.S. PATENT DOCUMENTS

| 5,886,686 | A  | * | 3/1999  | Chen ............................ 345/168 |
| 6,166,722 | A  | * | 12/2000 | Kawabe et al. ............... 345/169 |
| 6,369,798 | B1 | * | 4/2002  | Yatsu et al. ................... 345/167 |
| 6,476,795 | B1 | * | 11/2002 | Derocher et al. ............. 345/163 |
| 8,537,541 | B2 | * | 9/2013  | Zhang ...................... 361/679.55 |

\* cited by examiner

*Primary Examiner* — Robert J Hoffberg
*Assistant Examiner* — Hung Dang
(74) *Attorney, Agent, or Firm* — Muncy, Geissler, Olds & Lowe, P.C.

(57) ABSTRACT

A detachable touch structure for a portable electronic device is disclosed. The detachable touch structure comprises a flexible board, a flexible touch panel, a control module, and a linkage element; the flexible touch panel is superimposedly disposed on the flexible board; the control module is connected with the flexible board and electrically connected with the flexible touch panel, and the control module comprises two sliding slot structures each comprising a first sliding slot and a second sliding slot communicated with each other; the linkage element comprises two positioning levers, the linkage element has one end pivotally connected with the flexible board and the other end movably connected with each one of the sliding slot structures via each one of the positioning levers respectively. When two ends of the flexible board are bended by force, the detachable touch structure can be in a tablet form or a mouse form.

22 Claims, 10 Drawing Sheets

PORTABLE ELECTRONIC DEVICE AND DETACHABLE TOUCH STRUCTURE THEREOF

BACKGROUND OF THE INVENTION

1. Field of the Invention

The present invention relates to a detachable touch structure of a portable electronic device, and more particularly, to a detachable touch structure which can be transformed into a mouse form.

2. Description of the Related Art

In general, a portable computer such as a notebook PC or a minicomputer is equipped with a touch panel to perform functions of a mouse commonly used with a desktop PC and to facilitate cursor control on a user interface. However, some people are accustomed to using mice and find it inconvenient to use touch panels; therefore, they will use externally and electrically connected mice to operate user interfaces even when their portable computers are provided with touch panels. As such, they have to carry mice along with portable computers and to sacrifice the compactness of portable computers. Besides, it is troublesome for users using wireless mice, because they have to pay attention to the power level of the wireless mice and to replace batteries/recharge the mice to keep the mice working.

Therefore, it is desirable to provide a device whose structure can be transformed to act as a touch panel or a mouse to eliminate the need for an additional mouse and to save space.

SUMMARY OF THE INVENTION

It is an object of the present invention to provide a detachable touch structure which can be transformed into a mouse form.

It is another object of the present invention to provide a portable electronic device which comprises the detachable touch structure.

In order to achieve the objects, the present invention discloses a detachable touch structure for a portable electronic device; the portable electronic device comprises a containing recess for disposing the detachable touch structure. The detachable touch structure comprises a flexible board, a flexible touch panel, a control module, and a linkage element; the flexible touch panel is superimposedly disposed on the flexible board; the control module is connected with the flexible board and electrically connected with the flexible touch panel, and the control module comprises two sliding slot structures each comprising a first sliding slot and a second sliding slot communicated with each other; the linkage element comprises two positioning levers, the linkage element has one end pivotally connected with the flexible board and the other end movably connected with each one of the sliding slot structures via each one of the positioning levers respectively. When two ends of the flexible board are bended by force, the two positioning levers move along different paths with respect to the two sliding slot structures to different positions respectively to allow the detachable touch structure to be in a tablet form or a mouse form.

The portable electronic device comprises a body, a fastening element, and the detachable touch structure as described above. The body comprises a containing recess; a fastening element is combined with the body; and a touch structure is detachably disposed at the containing recess. When the touch structure is in the tablet form, the fastening element fixes the touch structure in the containing recess.

DETAILED DESCRIPTION OF THE PREFERRED EMBODIMENT

The advantages and innovative features of the invention will become more apparent from the following detailed description when taken in conjunction with the accompanying drawings.

The detachable touch structure of the present invention can be applied in portable electronic devices. In an embodiment of the present invention, the portable electronic device is a notebook PC; however, the portable electronic device can be a mini computer, a tablet PC or any other electronic devices having touch panels or modules.

Figure 1:
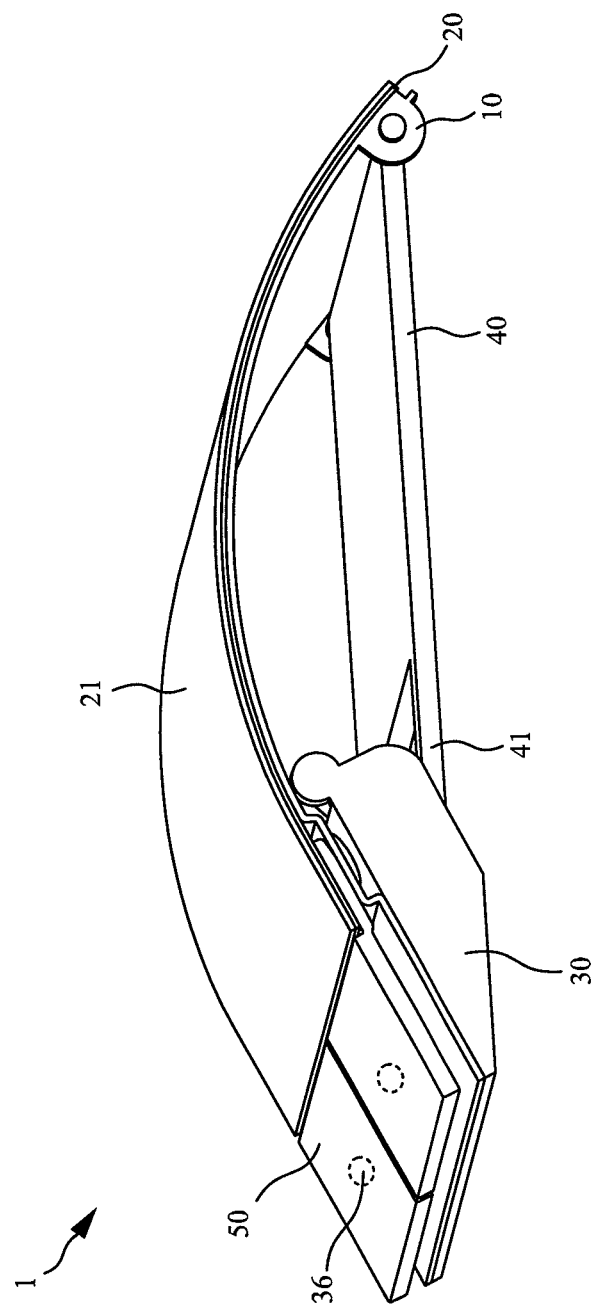
FIG. 1 illustrates a view of a detachable touch structure in a mouse form for a first embodiment of the present invention.
Figure 2:
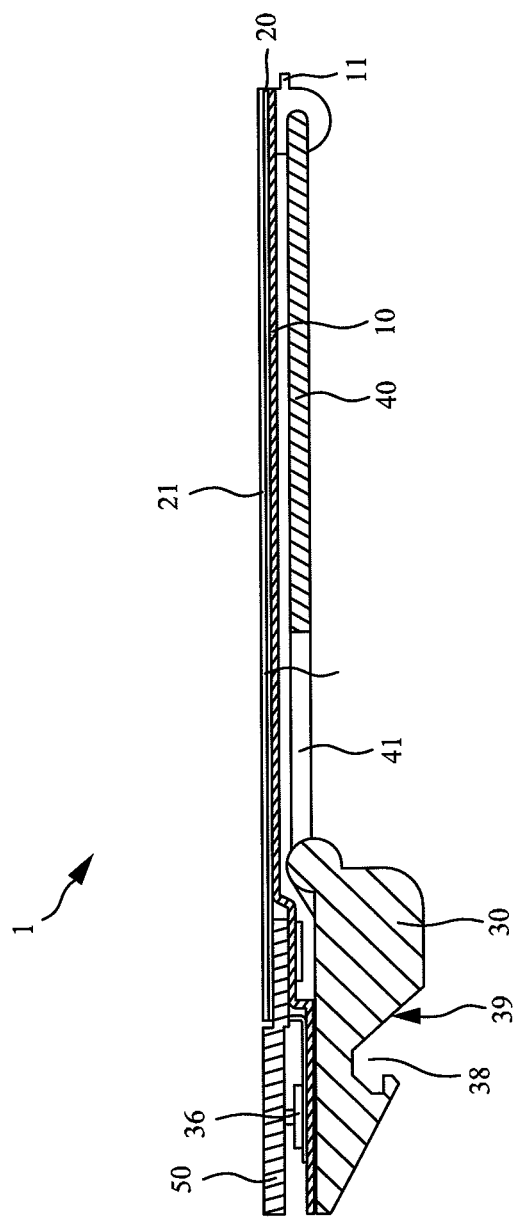
FIG. 2 illustrates a sectional view of the detachable touch structure in a tablet form for the first embodiment of the present invention.

Please refer to FIG. 1 and FIG. 2. FIG. 1 illustrates a view of a detachable touch structure in a mouse form for a first embodiment of the present invention; FIG. 2 illustrates a sectional view of the detachable touch structure in a tablet form for the first embodiment of the present invention.

As shown in FIG. 1, the detachable touch structure 1 comprises a flexible board 10, a flexible touch panel 20, a control module 30, and a linkage element 40. The flexible board 10 acts as a major framework of the detachable touch structure 1; the flexible touch panel 20 is superimposedly disposed on the flexible board 10, the flexible touch panel 20 can be attached to the flexible board 10 by gluing to provide a touch function when the detachable touch structure 1 is in a tablet form. In this embodiment, the flexible board 10 and the flexible touch panel 20 are made of elastic materials (such as rubber or flexible metals) to allow the detachable touch structure 1 to be bent into a mouse form, shown in FIG. 1, while the detachable touch structure 1 is in the tablet form, shown in FIG. 2, under normal operation condition. Besides, the flexible touch panel 20 further comprises a thin film layer 21 attached to a surface of the flexible touch panel 20 for protecting the flexible touch panel 20 or keeping the flexible touch panel 20 from being stained. In this embodiment, the thin film layer 21 can be made of polyester or other like materials.

The control module 30 is connected with the flexible board 10 by using a screw or gluing to fix it thereon. The control module 30 is electrically connected with the flexible touch panel 20 via electrical contacts for obtaining touch signals from the flexible touch panel 20 when the flexible touch panel 20 is in the tablet form. The control module 30 further comprises a first fixing portion 38 for fixing the detachable touch structure 1 in a containing recess (not shown in figure) of the portable electronic device. In this embodiment, the first fixing portion 38 is a slot and comprises an inclined plane structure 39 or the like.

The linkage element 40 is used for transforming and positioning the detachable touch structure 1 between the mouse form and the tablet form. The linkage element 40 comprises two positioning levers 41, the linkage element 40 has one end pivotally connected with the flexible board 10 and the other end movably connected with the control module 30 via each positioning lever 41. When two ends of the flexible board 10 are bended by force, a displacement of the linkage element 40 can turn the flexible board 10 into a curved shape or can keep it flat, thereby switching the detachable touch structure 1 between the mouse form and the tablet form.

Furthermore, as shown in FIG. 1 and FIG. 2, the detachable touch structure 1 further comprises a plurality of keys 50, each key 50 has one end connected to the flexible board 10 and a space to keep the key 50 and the flexible board 10 separated. The control module 30 comprises a plurality of switches 36 disposed in the space and corresponded to the plurality of keys 50 respectively; therefore, when any key is pressed, a corresponding switch 36 is triggered to generate and send a control signal to the portable electronic device 1. In this embodiment, the present invention uses the plurality of keys 50 to correspond to a traditional mouse structure, but the present invention can also use any key 50 as a mouse wheel, or to extend the flexible touch panel 20 to include a touch key area for performing key functions; therefore, there can be many variations for the present invention.

Figure 3:
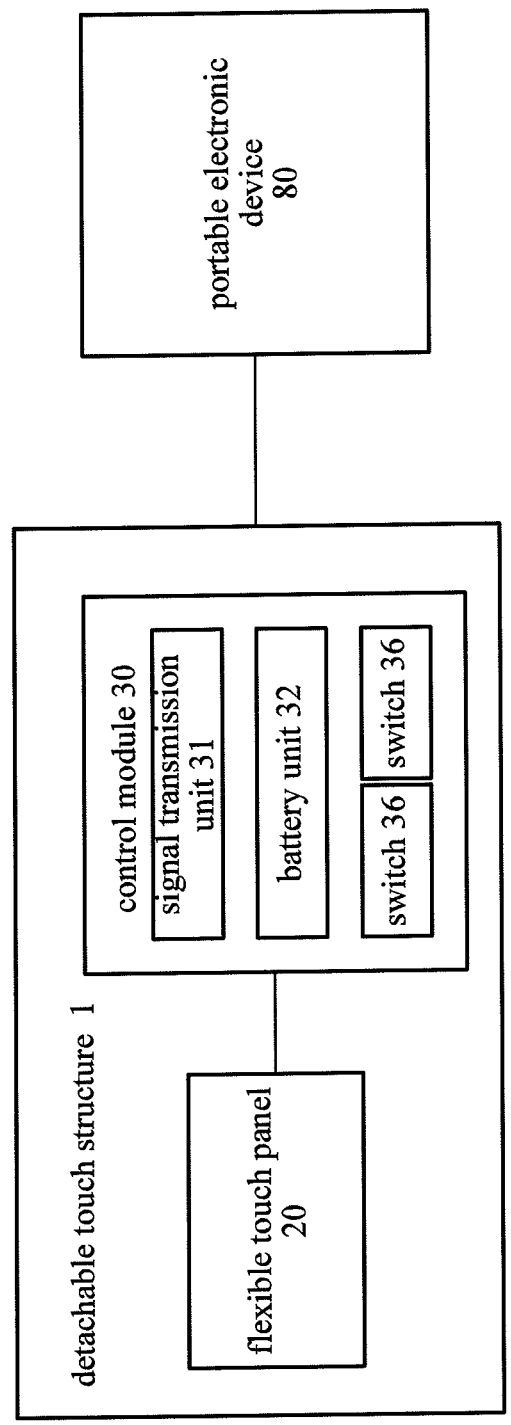
FIG. 3 illustrates a system diagram of the detachable touch structure and the portable electronic device.

Please now refer to FIG. 3, which illustrates a system diagram of the detachable touch structure and the portable electronic device. As shown in FIG. 3, the control module 30 comprises a signal transmission unit 31 and a battery unit 32 disposed therein. When the detachable touch structure 1 is in the mouse form, it detaches from the body 81 of the portable electronic device 80 and uses the signal transmission unit 31 for transmitting signals between the detachable touch structure 1 and the portable electronic device 80 wirelessly; so the detachable touch structure 1 acts as a wireless mouse. In this embodiment, the signal transmission unit 31 can be a Bluetooth transmission unit or other devices capable of wireless transmission. The battery unit 32 supply power to the detachable touch structure 1 when it is in the mouse form, the battery unit 32 can be charged when the detachable touch structure 1 is electrically connected with the portable electronic device 80.

Figure 4:
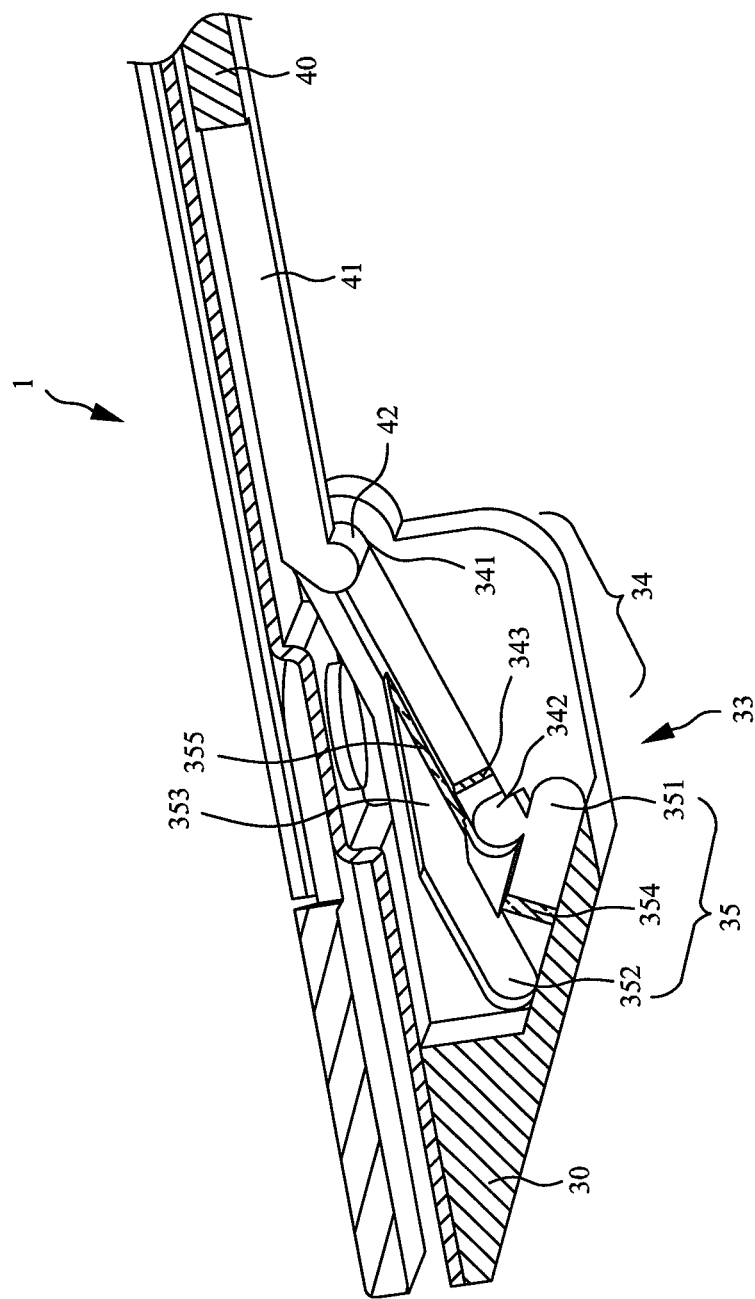
FIG. 4 illustrates a view of a positioning lever in a sliding slot structure when the detachable touch structure is in the tablet form.
Figure 5:
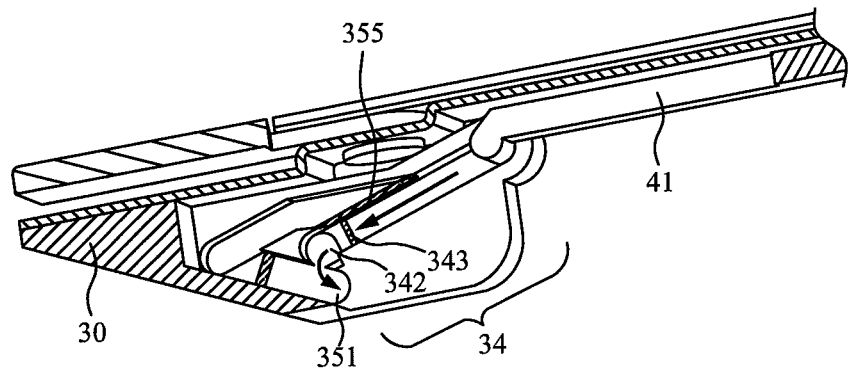
FIG. 5 illustrates an operational view of the positioning lever of the detachable touch structure moves from the tablet form into a mouse form.
Figure 6:
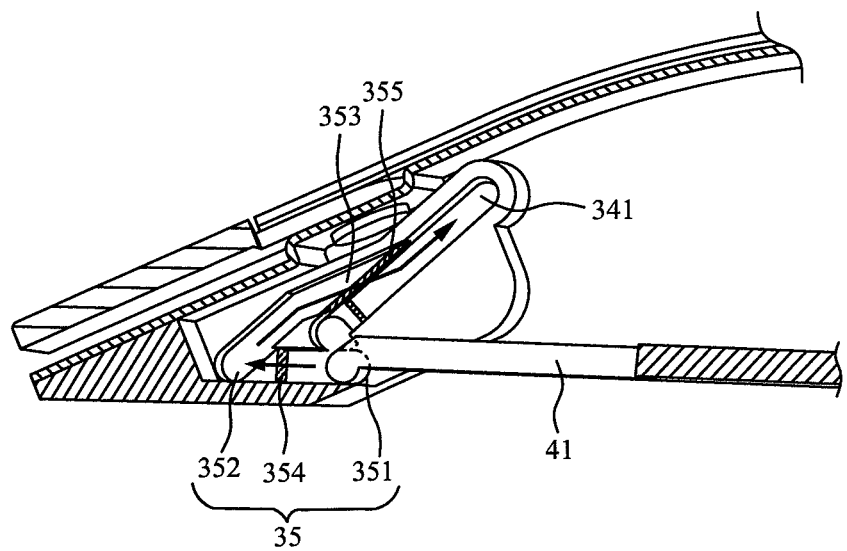
FIG. 6 illustrates an operational view of the positioning lever of the detachable touch structure moves from the mouse form into the tablet form.

Please refer to FIG. 4 to FIG. 6. FIG. 4 illustrates a view of a positioning lever 41 in a sliding slot structure 33 when the detachable touch structure 1 is in the tablet form; FIG. 5 illustrates an operational view of the positioning lever 41 of the detachable touch structure 1 moves from the tablet form into a mouse form; FIG. 6 illustrates an operational view of the positioning lever 41 of the detachable touch structure 1 moves from the mouse form into the tablet form.

As shown in FIG. 4, the control module 30 comprises two sliding slot structures 33 symmetrically disposed at each side of the control module 30 (only one side is shown in figure, and the sliding slot structure 33 of the other side is symmetrical to that shown in FIG. 4), each sliding slot structure 33 comprises a first sliding slot 34 and a second sliding slot 35 communicated with each other. The two positioning levers 41 of the linkage element 40 have column structures 42 formed at their front ends respectively and provided for inserting into the corresponding sliding slot structures 33; therefore, each positioning lever 41 can move along a different path of the sliding slot structure 33 according to user's operation.

The first sliding slot 34 comprises a first starting end 341 and a first communication end 342, wherein the first communication end 342 communicates with the second sliding slot 35; the second sliding slot 35 comprises a second starting end 351, a bending portion 352, and a second communication end 353, wherein the second communication end 353 communicates with the first sliding slot 35.

Additionally, in order to let the positioning lever 41 move in a predetermined path in the sliding slot structure 33, in this embodiment, the first sliding slot 34 further comprises a first position limiting structure 343 disposed between the first communication end 342 and the second communication end 353, the first position limiting structure 343 prevents the positioning lever 41 from returning to the first starting end 341 from the first communication end 342. The second sliding slot 35 further comprises a second position limiting structure 354 and the third position limiting structure 355; the second position limiting structure 354 is disposed between the second starting end 351 and the bending portion 352 and is used for preventing the positioning lever 41 from returning to the second starting end 351 from the bending portion 352; the third position limiting structure 355 is disposed between the second communication end 353 and the first sliding slot 34 and is used for limiting positioning lever 41 from entering the second communication end 353 from the first sliding slot 34.

When the positioning lever 41 is at the first starting end 341, the detachable touch structure 1 is in the tablet form.

As shown in FIG. 5, when a user applies a force to bend the detachable touch structure 1 from both sides, the placement of the first position limiting structure 343 and third position limiting structure 355 will limit the positioning lever 41 to move only in the first sliding slot 34 (the direction is marked by arrows) until the positioning lever 41 passes the first communication end 342 and arrives at the second starting end 351. When the positioning lever 41 is at the second starting end 351, the detachable touch structure 1 is in the mouse form.

As shown in FIG. 6, when the user applies another force to bend the detachable touch structure 1 from both sides once again, the positioning lever 41 can only move from the second starting end 351 to the bending portion 352 in the second sliding slot 35 (marked by arrows). The placement of the second position limiting structure 354 will prevent the positioning lever 41 from returning to the second starting end 351 when it passed the second position limiting structure 354 and enters the bending portion 352. After that, when the user stops applying the force to the detachable touch structure 1, the positioning lever 41 can only starts from the bending portion 352, moves along the second sliding slot 35, and then passes the second communication end 353 to enter the first sliding slot 34, and finally returns to the first starting end 341. At this time the detachable touch structure 1 has resumed its tablet form.

Figure 7:
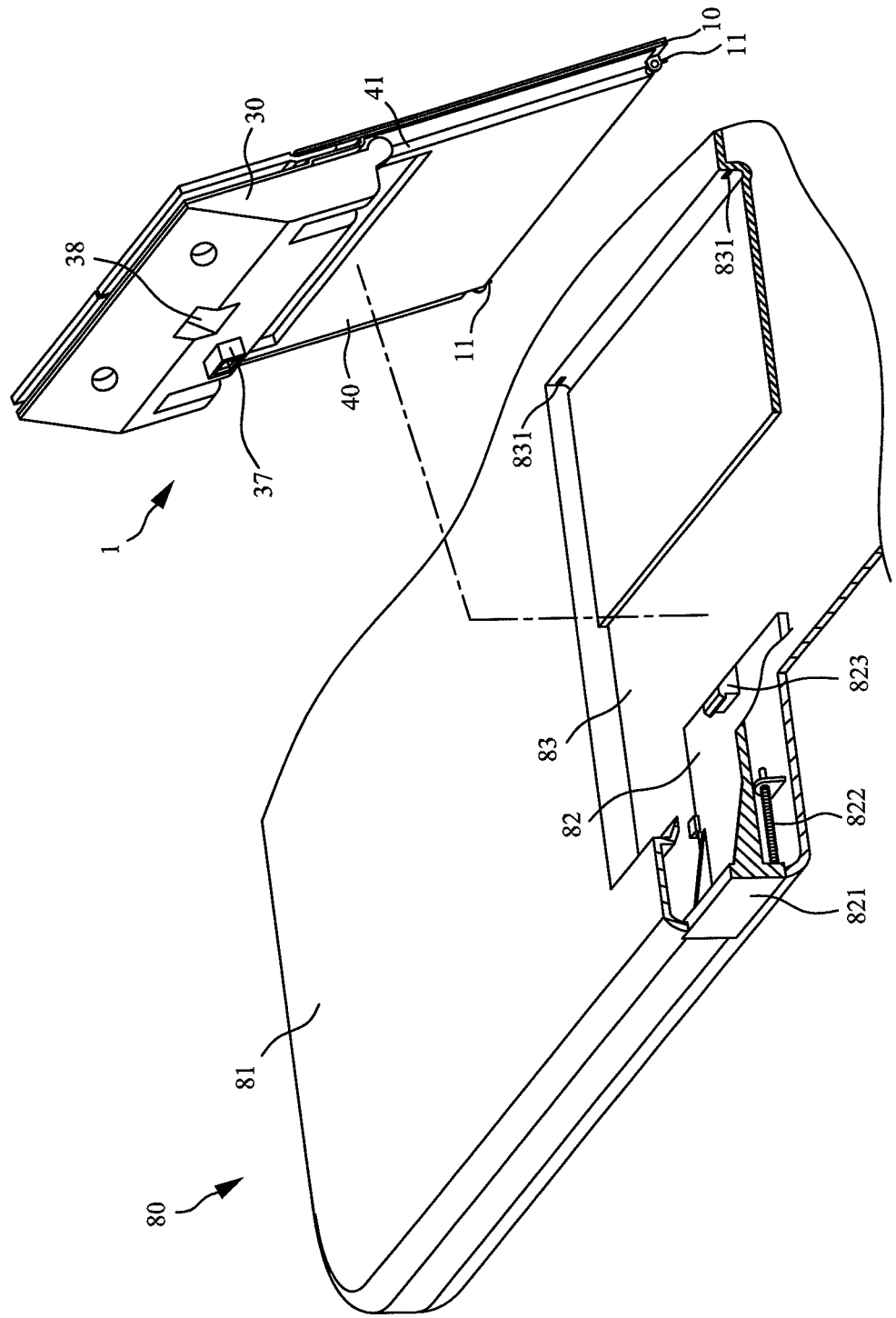
FIG. 7 illustrates a view of the detachable touch structure disposed in the portable electronic device for the first embodiment of the present invention.

Please refer to FIG. 7 for a view of the detachable touch structure disposed in the portable electronic device for the first embodiment of the present invention. As shown in FIG. 7, the portable electronic device 80 comprises a body 81 and a fastening element 82. The body 81 comprises a casing and various electronic components (such as a processor, a memory, and a circuit board, etc.) included therein, the body 81 also comprises a containing recess 83 for disposing the detachable touch structure 1. In this embodiment, the fastening element 82 is movably combined with the body 81, when a force is applied to the fastening element 82, the fastening element 82 moves between the initial position and the released position with respect to the body 81. The fastening element 82 extends from the surface of the body 81 inwardly to the containing recess 83.

The fastening element 82 comprises a pushing portion 821, an elastic element 822, and a clamping portion 823. The pushing portion 821 is provided for the user to apply a force on the pushing portion 821 so as to move the fastening element 82; the elastic element 822 allows the fastening element 82 to automatically return to the initial position with its resilient restoring force; the clamping portion 823 is used for fixing the detachable touch structure 1 in the containing recess 83 when the detachable touch structure 1 is in the tablet form.

The containing recess 83 comprises at least a corresponding fixing portion 831 for helping fix the detachable touch structure 1 in the containing recess 83 when the detachable touch structure 1 is in the tablet form.

The control module 30 of the detachable touch structure 1 further comprises a connector 37, when the detachable touch structure 1 is disposed in the containing recess 83 of the portable electronic device 80, the control module 30 is electrically connected with the body 81 of the portable electronic device 80 via the connector 37 for signal transmission.

The flexible board 10 of the detachable touch structure 1 comprises at least one second fixing portion 11 disposed at an end neighboring to a point where the flexible board 10 and the linkage element 40 is pivotally connected, and the at least one second fixing portion 11 corresponds to at least one corresponding fixing portion 831 of the containing recess 83.

Figure 8:
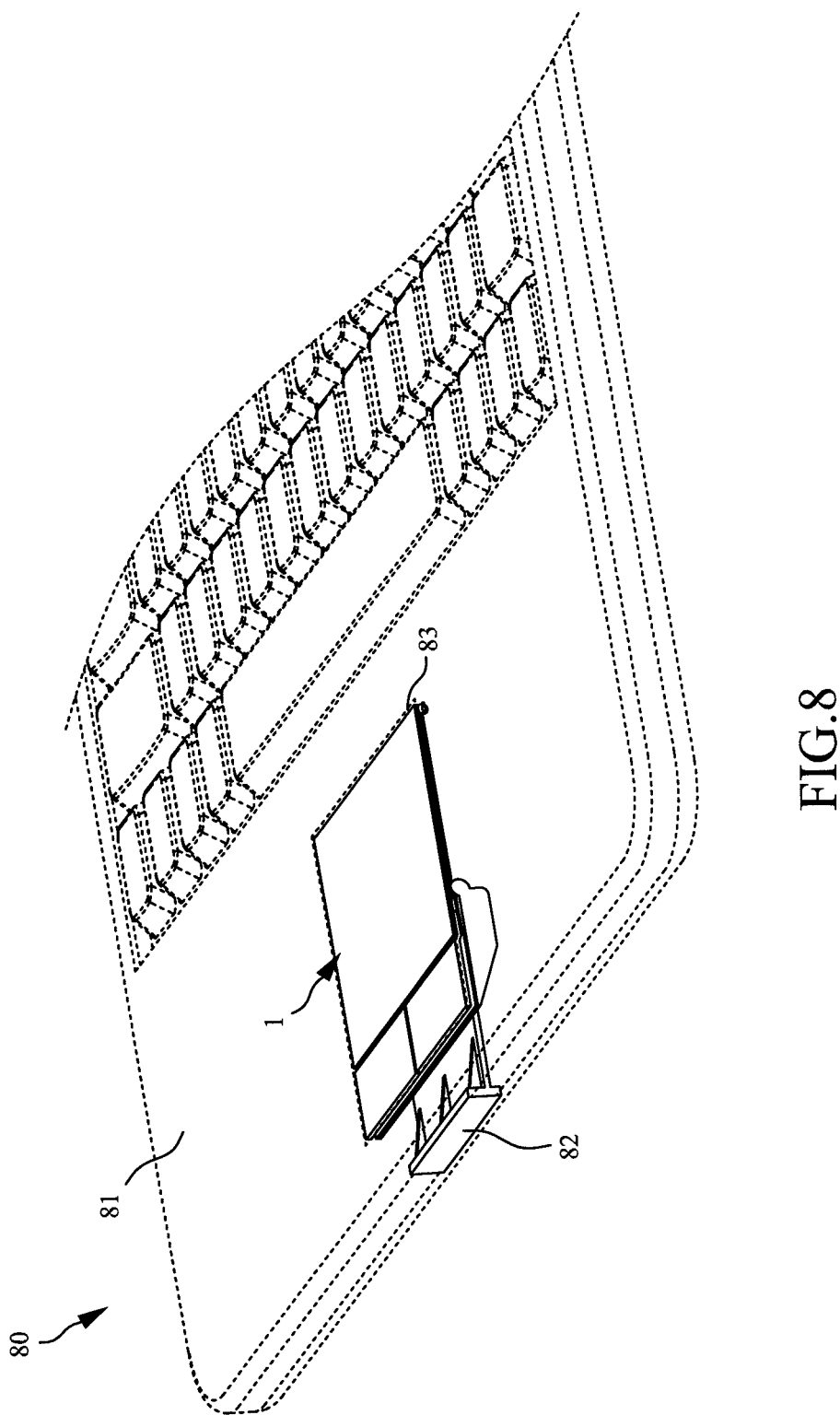
FIG. 8 illustrates a view of the detachable touch structure disposed in the containing recess when the detachable touch structure is in the tablet form for the first embodiment of the present invention.
Figure 9:
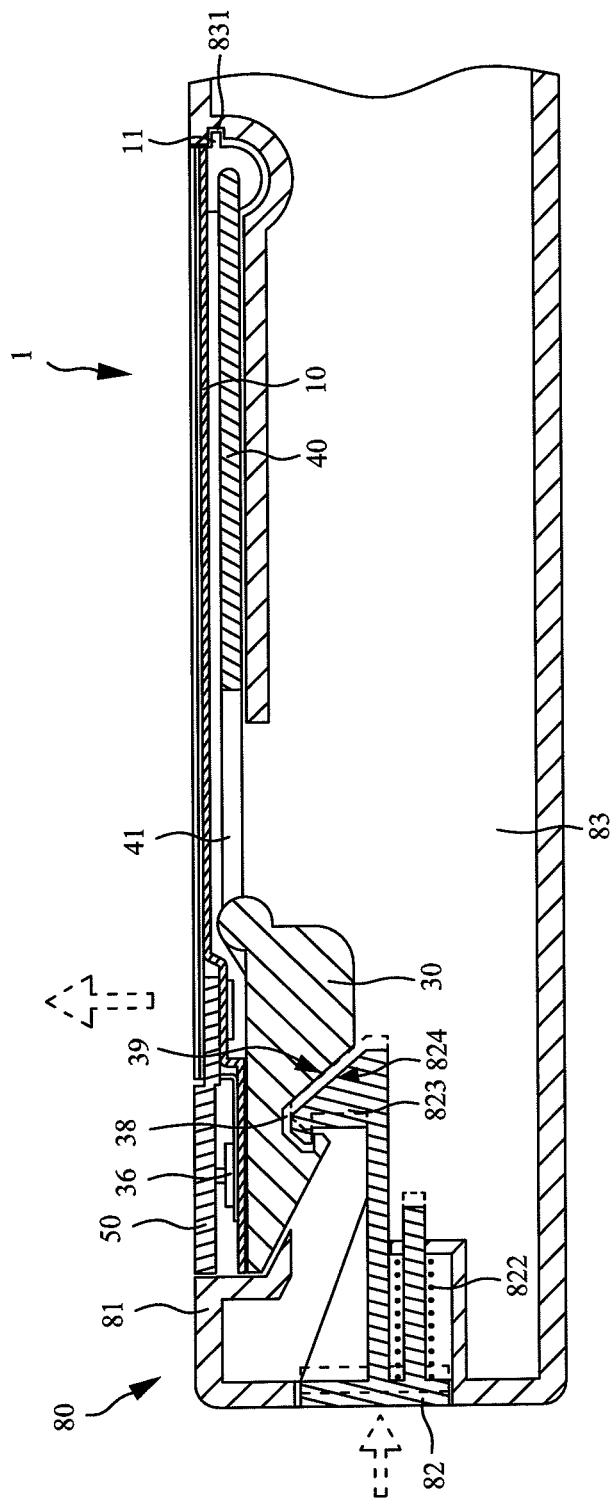
FIG. 9 illustrates a sectional view of the detachable touch structure in the tablet form when the detachable touch structure is taken out of the containing recess.

Please refer to both FIG. 8 and FIG. 9. FIG. 8 illustrates a view of the detachable touch structure disposed in the containing recess when the detachable touch structure is in the tablet form; FIG. 9 illustrates a sectional view of the detachable touch structure in the tablet form when the detachable touch structure is taken out of the containing recess.

As shown in FIGS. 8 and 9, when the detachable touch structure 1 is in the tablet form, it can be disposed in the containing recess 83 of the portable electronic device 80 to act as a touch panel for the portable electronic device 80. At this time, the fastening element 82 remains at the initial position, and the clamping portion 823 of the fastening element 82 is mutually fastened with the first fixing portion 38 of control module 30, wherein the first fixing portion 38 comprises an inclined plane structure 39, the clamping portion 823 of the fastening element 82 comprises a corresponding inclined plane structure 824; the at least one corresponding fixing portion 831 of the containing recess 83 is mutually fastened with the at least one second fixing portion 11 of the flexible board 10. Through the fastened structure as described above, the detachable touch structure 1 is fixed stably in the containing recess 83.

In this embodiment, the clamping portion 823 is an independent hook structure, and the first fixing portion 38 is a corresponding slot structure; the at least one corresponding fixing portion 831 is a recess structure, and the at least one second fixing portion 11 is a corresponding column structure. However, the present invention can have various implementations for fastening and fixing structures, for example, the fixing portion and the corresponding fixing portion are exchangeable or replaced by other similar fixing structures.

When the user starts pushing the fastening element 82 from the initial position, the clamping portion 823 will move in the direction shown in arrows (as in FIG. 9), at this time the clamping portion 823 gradually detaches from the first fixing portion 38, the inclined plane structure 824 of the portion 823 moves in relation to the inclined plane structure 39 of the first fixing portion 38 to push the detachable touch structure 1 out of the containing recess 83.

As shown in FIG. 9, when the fastening element 82 is pushed to the released position (shown as the dotted lines in FIG. 9), the clamping portion 823 is completely detached and the detachable touch structure 1 is partly pushed out of the containing recess 83, so now the user can take the detachable touch structure 1 out.

Figure 10:
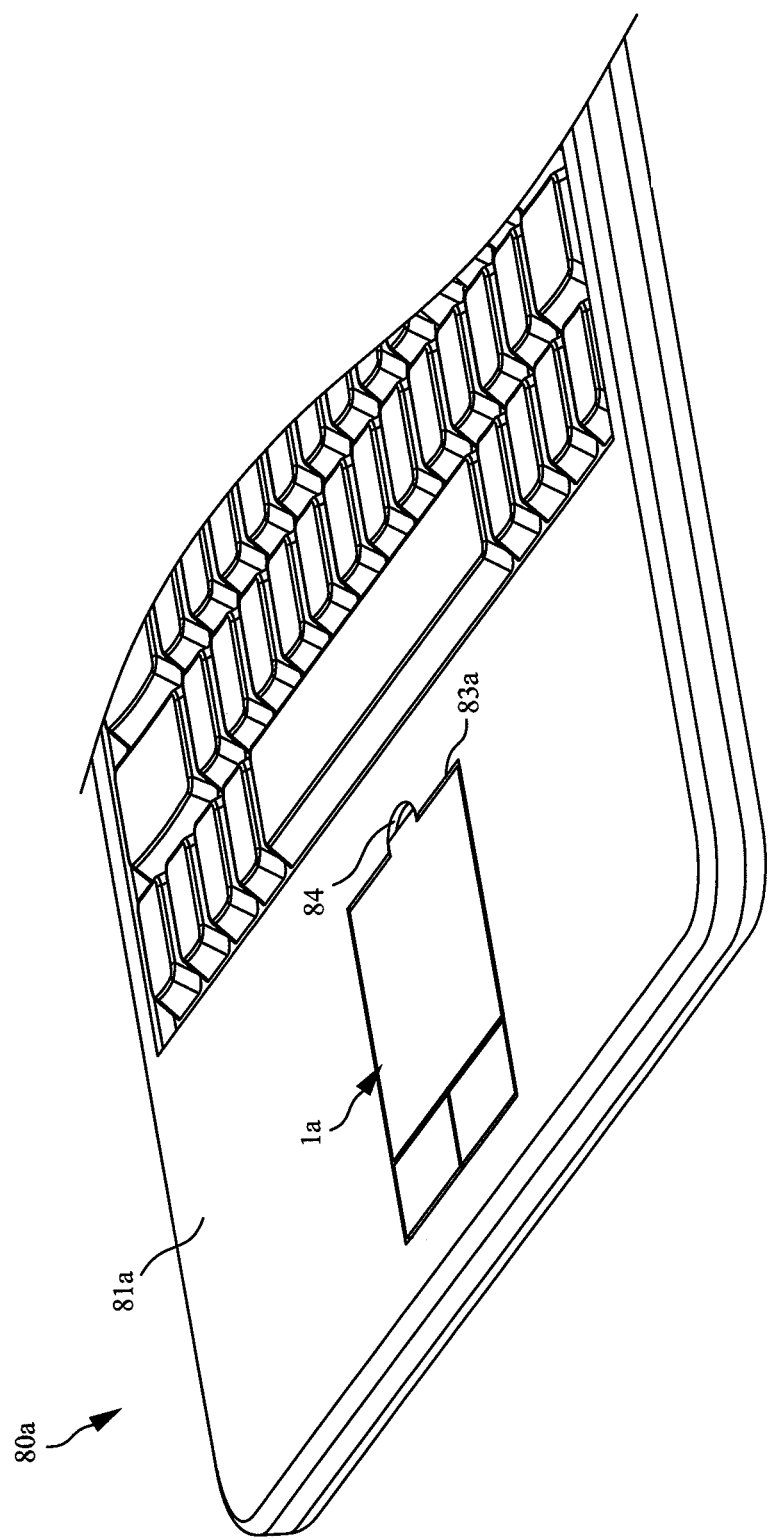
FIG. 10 illustrates a view of the detachable touch structure disposed in the containing recess when the detachable touch structure is in the tablet form for a second embodiment of the present invention.
Figure 11:
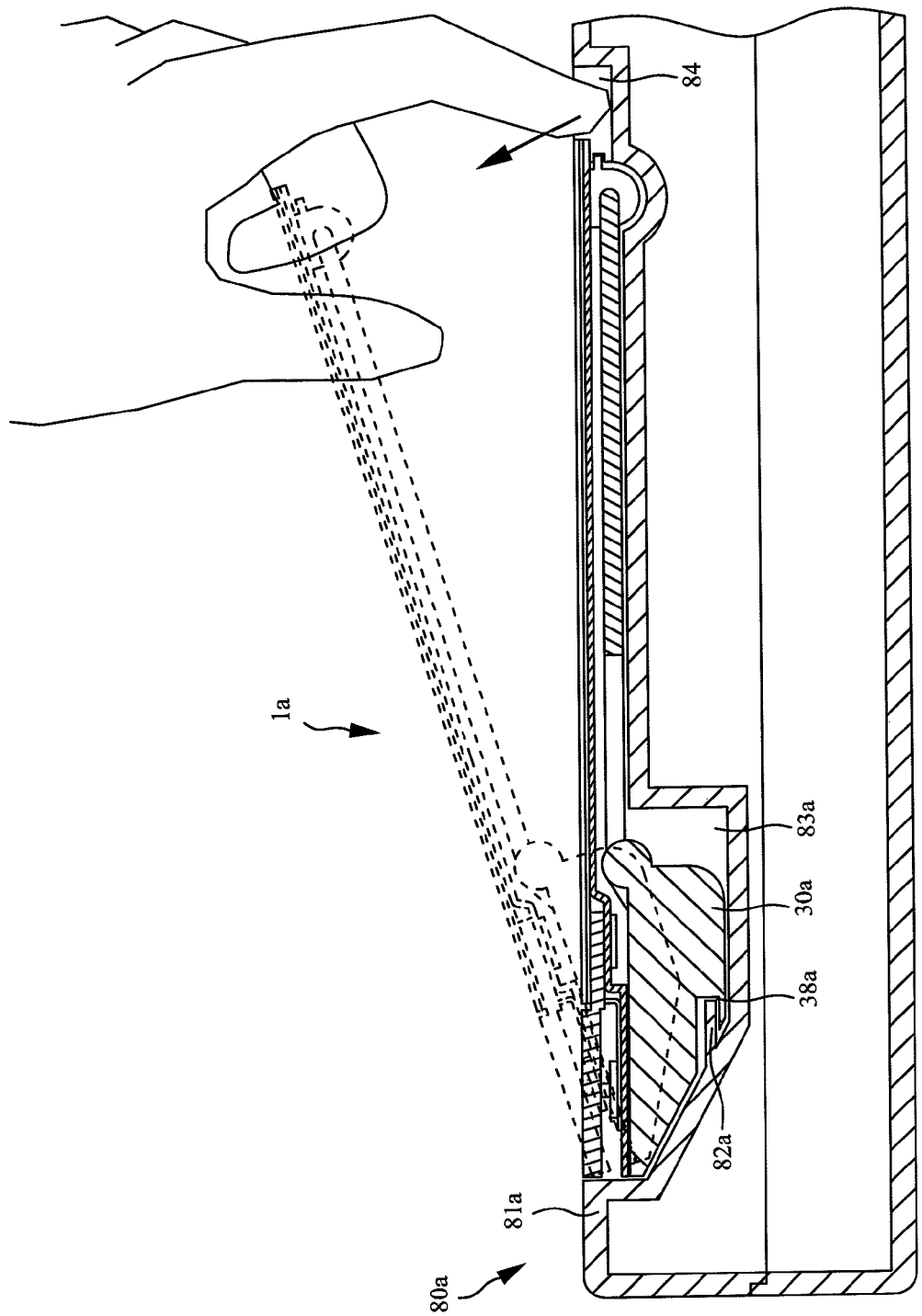
FIG. 11 illustrates a view of the detachable touch structure in the tablet form when the detachable touch structure is taken out of the containing recess.

Please refer to both FIG. 10 and FIG. 11. FIG. 10 illustrates a view of the detachable touch structure disposed in the containing recess when the detachable touch structure is in the tablet form for a second embodiment of the present invention; FIG. 11 illustrates a sectional view of the detachable touch structure in the tablet form when the detachable touch structure is taken out of the containing recess.

As shown in FIG. 10 and FIG. 11, the second embodiment is a variation of the first embodiment. In this embodiment, a protruding structure (fastening element 82a) in the containing recess 83a of the body 81a is used as a replacement of the fastening element 82 movably disposed in the body 81 of the portable electronic device 80, and the first fixing portion 38a of the control module 30a of the detachable touch structure 1a is implemented as a recess for mutually fastening with the fastening element 82a. Furthermore, the body 81a of the portable electronic device 80a further comprises a concave structure 84 which is disposed adjacent to the containing recess 83a. When the user wishes to take out the detachable touch structure 1a of the containing recess 83a, the user can place his/her finger in the concave structure 84 to lift one end of the detachable touch structure 1a, and then the user can pull the detachable touch structure 1a out of the containing recess 83a.

Therefore, by using the design of the detachable touch structure 1, 1a, the detachable touch structured 183, 83a can be disposed in the containing recesses 83, 83a of the portable electronic devices 80, 80a as touch panels respectively; the detachable touch structures 1, 1a can be forced to detach from the containing recesses 83, 83a to be transformed into the mouse forms respectively for performing mouse functions, thereby eliminating the need for carrying an extra mouse and also saving space by combining the touch panel and mouse functions.

Furthermore, the present invention also provides a portable electronic device using the detachable touch structure. The portable electronic device comprises a body, a fastening element and the detachable touch structure as described above; the body comprises a containing recess for disposing the detachable touch structure; the fastening element can combine with the body. The detailed structure and operation of the portable electronic device will not be further explained since the detachable touch structure is the same as that described above.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A detachable touch structure for a portable electronic device, the portable electronic device comprising a containing recess for disposing the detachable touch structure, the detachable touch structure comprising:
a flexible board;
a flexible touch panel superimposedly disposed on the flexible board;
a control module connected with the flexible board, the control module being electrically connected with the flexible touch panel and comprising two sliding slot structures, each sliding slot structure comprising a first sliding slot and a second sliding slot communicated with each other; and
a linkage element comprising two positioning levers, the linkage element having one end pivotally connected with the flexible board and the other end movably connected with each one of the sliding slot structures via each one of the positioning levers respectively;
when two ends of the flexible board are bended by force, the two positioning levers move along different paths with respect to the two sliding slot structures to different positions respectively to allow the detachable touch structure to be in a tablet form or a mouse form.

2. The detachable touch structure as claimed in claim 1, wherein the first sliding slot comprises a first starting end and a first communication end, the first communication end communicates with the second sliding slot; the second sliding slot comprises a second starting end, a bending portion, and a second communication end, the second communication end communicates with the first sliding slot; when the positioning lever moves to the first starting end, the detachable touch structure is in a tablet form, when the positioning lever moves to the second starting end, the detachable touch structure is in the mouse form.

3. The detachable touch structure as claimed in claim 2, wherein the first sliding slot further comprises a first position limiting structure disposed between the first communication end and the second communication end, the first position limiting structure prevents the positioning lever from returning to the first starting end from the first communication end.

4. The detachable touch structure as claimed in claim 3, wherein the second sliding slot further comprises a second position limiting structure disposed between the second starting end and the bending portion, the second position limiting structure prevents the positioning lever from returning to the second starting end from the bending portion.

5. The detachable touch structure as claimed in claim 4, wherein the second sliding slot further comprises a third position limiting structure disposed between the second communication end and the first sliding slot, the third position limiting structure prevents the positioning lever from entering the second communication end from the first sliding slot.

6. The detachable touch structure as claimed in claim 1, wherein the control module further comprises a first fixing portion for fixing the detachable touch structure in the containing recess.

7. The detachable touch structure as claimed in claim 6, wherein the flexible board comprises at least one second fixing portion disposed at an end neighboring to a point pivotally connected with the linkage element.

8. The detachable touch structure as claimed in claim 1, wherein the control module further comprises a signal transmission unit for transmitting the control signal to the portable electronic device wirelessly.

9. The detachable touch structure as claimed in claim 1, wherein the control module further comprises a battery unit for supplying power when the detachable touch structure is in the mouse form.

10. A portable electronic device, comprising:
a body comprising a containing recess;
a fastening element combined with the body; and
a touch structure detachably disposed at the containing recess, wherein the touch structure comprises:
a flexible board;
a flexible touch panel superimposedly disposed on the flexible board;
a control module connected with the flexible board, the control module being electrically connected with the flexible touch panel and comprising two sliding slot structures, each sliding slot structure comprising a first sliding slot and a second sliding slot communicated with each other; and
a linkage element comprising two positioning levers, the linkage element having one end pivotally connected with the flexible board and the other end movably connected with each one of the sliding slot structures via each one of the positioning levers respectively;
when two ends of the flexible board are bended by force, the two positioning levers move along different paths with respect to the two sliding slot structures to different positions respectively to allow the detachable touch structure to be in a tablet form or a mouse form;
when the touch structure is in the tablet form, the fastening element is used for fixing the touch structure in the containing recess.

11. The portable electronic device as claimed in claim 10, wherein the first sliding slot comprises a first starting end and a first communication end, the first communication end communicates with the second sliding slot; the second sliding slot comprises a second starting end, a bending portion, and a second communication end, the second communication end communicates with the first sliding slot; when the positioning lever moves to the first starting end, the detachable touch structure is in the tablet form, when the positioning lever moves to the second starting end, the detachable touch structure is in the mouse form.

12. The portable electronic device as claimed in claim 11, wherein the first sliding slot further comprises a first position limiting structure disposed between the first communication end and the second communication end, the first position limiting structure prevents the positioning lever from returning to the first starting end from the first communication end.

13. The portable electronic device as claimed in claim 12, wherein the second sliding slot further comprises a second position limiting structure disposed between the second starting end and the bending portion, the second position limiting structure prevents the positioning lever from returning to the second starting end from the bending portion.

14. The portable electronic device as claimed in claim 13, wherein the second sliding slot further comprises a third position limiting structure disposed between the second communication end and the first sliding slot, the third position limiting structure prevents the positioning lever from entering the second communication end from the first sliding slot.

15. The portable electronic device as claimed in claim 10, wherein the control module further comprises a first fixing portion disposed with respect to the fastening element.

16. The portable electronic device as claimed in claim 15, wherein the fastening element is movably combined with the body, when the fastening element is at an initial position, the touch structure in the tablet form is fixed in the containing recess by the fastening element; when the fastening element moves from the initial position to a released position, the fastening element detaches from the first fixing portion to release the touch structure from the containing recess.

17. The portable electronic device as claimed in claim 16, wherein the fastening element further comprises an elastic element, the elastic element brings the fastening element back to the initial position by a resilient restoring force.

18. The portable electronic device as claimed in claim 16, wherein the first fixing portion comprises an inclined plane structure and the fastening element comprises a corresponding inclined plane structure.

19. The portable electronic device as claimed in claim 15, wherein the body further comprises a concave structure disposed adjacent to the containing recess, a force can be applied on the touch structure via the concave structure so as to let the touch structure detach from the containing recess.

20. The portable electronic device as claimed in claim 15, wherein the flexible board comprises at least one second fixing portion disposed at an end neighboring to a point pivotally connected with the linkage element; the containing recess comprises at least one corresponding fixing portion, wherein the least one second fixing portion corresponds to the at least one corresponding fixing portion.

21. The portable electronic device as claimed in claim 10, wherein the control module further comprises a signal transmission unit for transmitting the control signal to the body wirelessly.

22. The portable electronic device as claimed in claim 10, wherein the control module further comprises a battery unit for supplying power.

* * * * *